US011565620B2

(12) United States Patent
Wruck et al.

(10) Patent No.: US 11,565,620 B2
(45) Date of Patent: Jan. 31, 2023

(54) FUEL DELIVERY SYSTEMS, METHODS AND APPARATUS

(71) Applicant: Westmor Industries, LLC, Morris, MN (US)

(72) Inventors: Abe Wruck, Morris, MN (US); Meranda Hormann, Morris, MN (US)

(73) Assignee: Westmor Industries, LLC, Morris, MN (US)

( * ) Notice: Subject to any disclaimer, the term of this patent is extended or adjusted under 35 U.S.C. 154(b) by 453 days.

(21) Appl. No.: 16/744,153

(22) Filed: Jan. 15, 2020

(65) Prior Publication Data

US 2020/0223350 A1  Jul. 16, 2020

Related U.S. Application Data

(60) Provisional application No. 62/864,553, filed on Jun. 21, 2019, provisional application No. 62/792,494, filed on Jan. 15, 2019.

(51) Int. Cl.
 *B60P 3/22* (2006.01)
 *B67D 7/40* (2010.01)

(52) U.S. Cl.
 CPC .............. *B60P 3/2265* (2013.01); *B67D 7/40* (2013.01)

(58) Field of Classification Search
 CPC ................................ B60P 3/2265; B67D 7/40
 USPC ..................................................... 137/355.12
 See application file for complete search history.

(56) References Cited

U.S. PATENT DOCUMENTS

| 4,199,837 | A | 4/1980 | Fisco |
| 7,712,481 | B1* | 5/2010 | Mayer .................. E03F 9/00 137/355.24 |
| 2013/0087175 | A1* | 4/2013 | Petter .................. B08B 3/003 134/123 |
| 2015/0240940 | A1* | 8/2015 | Schmidt .............. F16H 61/423 60/450 |
| 2017/0197536 | A1* | 7/2017 | Mayer .................. B60R 19/24 |
| 2019/0184433 | A1* | 6/2019 | Reed .................. B05B 9/0403 |
| 2021/0129196 | A1* | 5/2021 | Pan .......................... E03F 9/007 |

FOREIGN PATENT DOCUMENTS

| CN | 208105462 U | * | 11/2018 | ................ E03F 7/10 |
| CN | 214019003 U | * | 8/2021 | ............. B08B 13/00 |

OTHER PUBLICATIONS

John Bean Technologies Corporation, JBT AeroTech, "Tempest Aircraft Washer: The Model of Efficiency", (c) 2010, 2 pages.
Petrillo, Alan M., "Handline Options for Engine Companies", Aug. 5, 2022, as available at https://www.fireapparatusmagazine.com/fire-apparatus/handline-options-for-engine-companies/#gref, 14 pages.
The Wayback Machine, Combination Jet/Vac Series-Aquatech, dated Aug. 5, 2022, 11 pages.
vactor.com, "This Changes Everything. Again" Vactor 2100i, Vactor Manufacturing, Inc. , Effective Nov. 2018, 8 pages.

* cited by examiner

*Primary Examiner* — Hilary L Gutman (57) ABSTRACT

Fuel delivery systems, such as those incorporated in propane trucks or other fuel delivery trucks, are provided for loading, transport and offloading of fuel and/or other deliverables. In some embodiments, a fuel transfer reel is supported forward of an engine compartment. In some embodiments, a fuel transfer reel is supported between an engine compartment and a fuel vessel.

20 Claims, 11 Drawing Sheets

FUEL DELIVERY SYSTEMS, METHODS AND APPARATUS

BACKGROUND

Fuel delivery systems, such as those incorporated in propane trucks or other fuel delivery trucks, are used to load, transport and offload fuel and/or other deliverables.

DESCRIPTION

Figure 1:
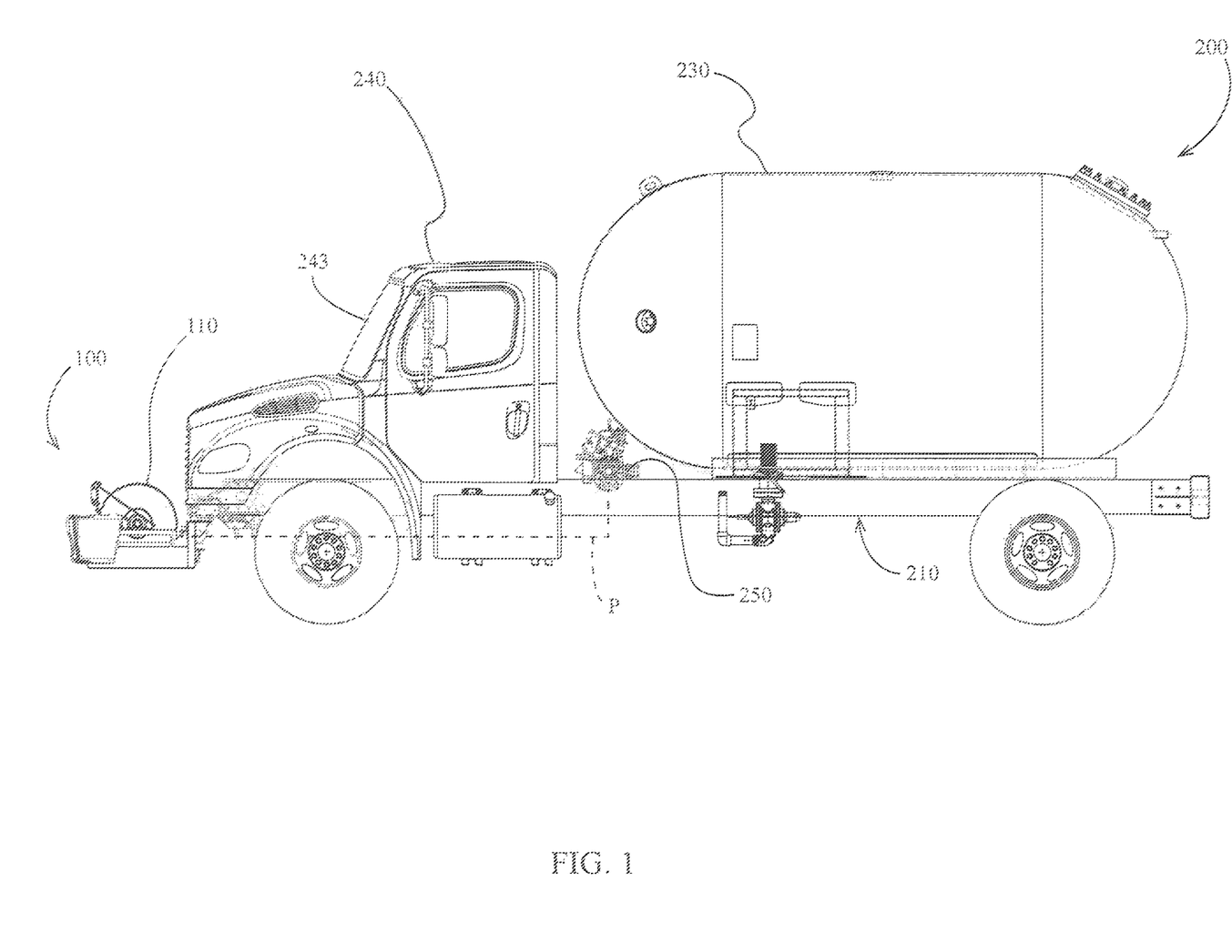
FIG. 1 is a side elevation view of an embodiment of a fuel delivery system.
Figure 3:
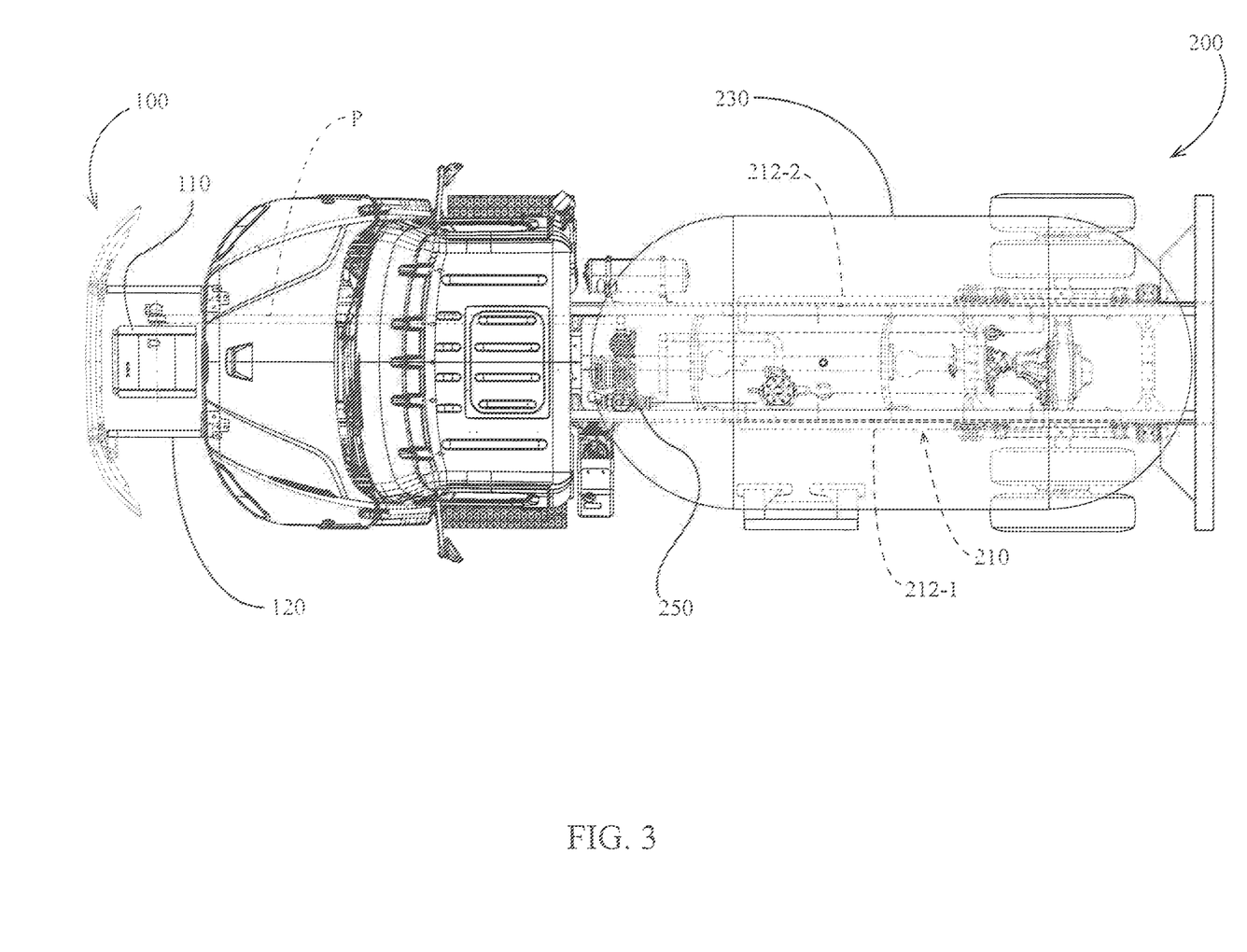
FIG. 3 is a top view of the fuel delivery system of FIG. 1.

Referring to the drawings, wherein like reference numerals designate identical or corresponding parts throughout the several views, FIGS. 1 and 3 illustrate a fuel delivery vehicle 200 (e.g., propane delivery vehicle, etc.) having a fuel storage vessel 230 supported on a frame 210 drawn by a truck 240. The frame 210 may comprise longitudinally extending rails 212-1, 212-2 (FIG. 3). In operation, fuel or other deliverable is optionally pumped by a pump through a meter 250 to a reel 110. The reel 110 is optionally disposed forward of the truck 240 (e.g., the cab 243 and/or engine compartment thereof). In some embodiments, fuel is delivered to reel 110 via piping P which extends beneath the truck 240 (e.g., the cab and/or engine compartment thereof). A hose (not shown) may be supported by and wound around the reel 110. In various embodiments and implementations, the reel 110 via the hose, may be used to load and/or unload fuel within the vessel 230.

Figure 2:
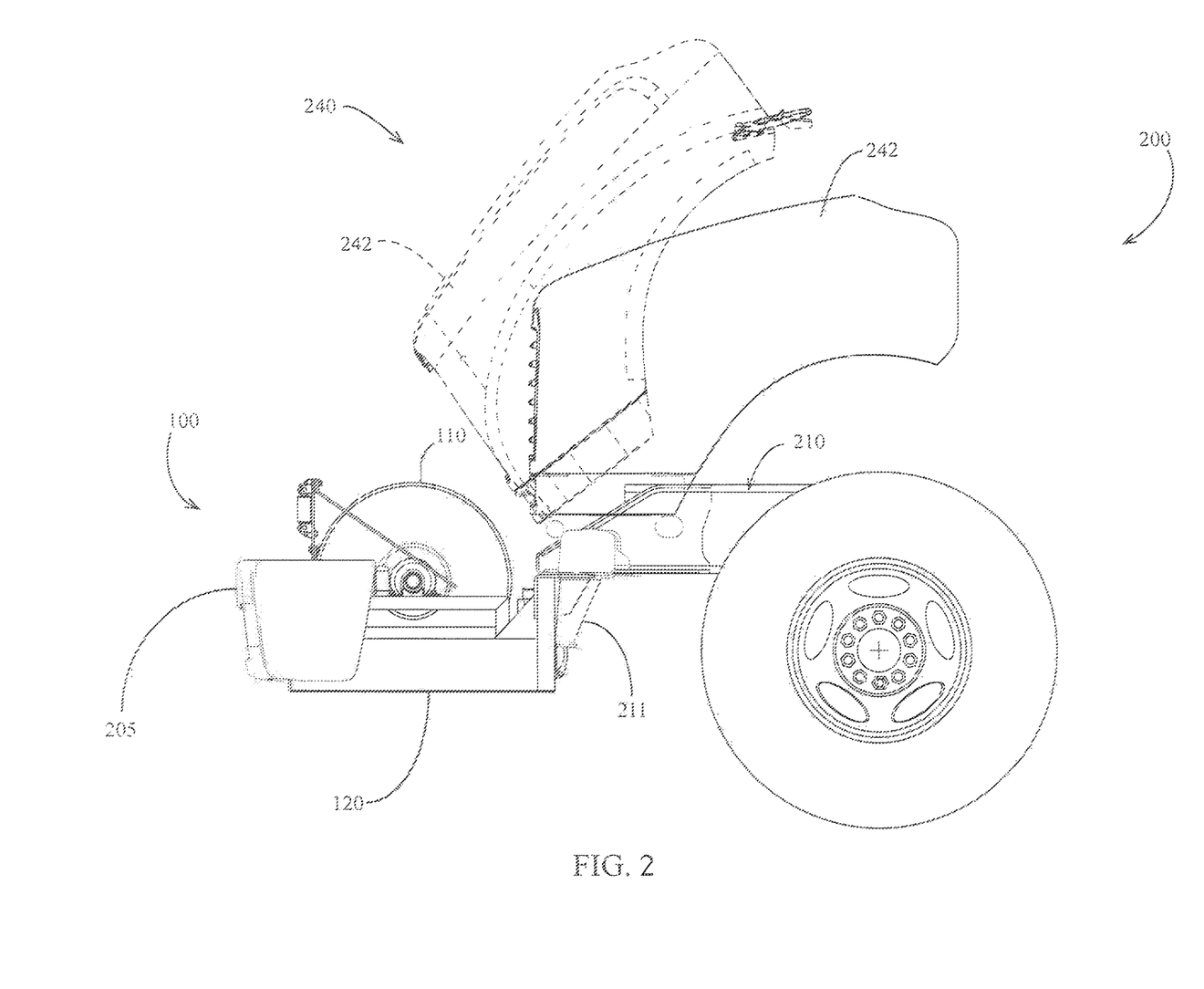
FIG. 2 is an enlarged view of a portion of FIG. 1.

Referring to FIG. 2, the reel 110 is optionally supported on a front reel assembly 100. In some embodiments, the front reel assembly 100 includes a platform 120 which is optionally mounted to a forward portion 211 of the frame 210 or other structure of the vehicle 200. The reel 110 is optionally supported on (e.g., mounted to) the platform 120. In some embodiments, the platform 120 supports the reel 110 in a location that does not interfere with opening a hood 242 of the truck 240 (e.g., to a fully open position). In some embodiments, the bumper 205 is mounted to a forward end of the platform 120. In some retrofit installations, in which the bumper 205 is previously mounted to the forward portion 211 of the frame 210, the bumper 205 is removed from the forward portion 211, then the platform 120 is mounted to the forward portion 211, and then bumper 205 is mounted to a forward end of platform 120. In other embodiments, the vehicle is initially assembled as shown in FIG. 2.

Figure 4:
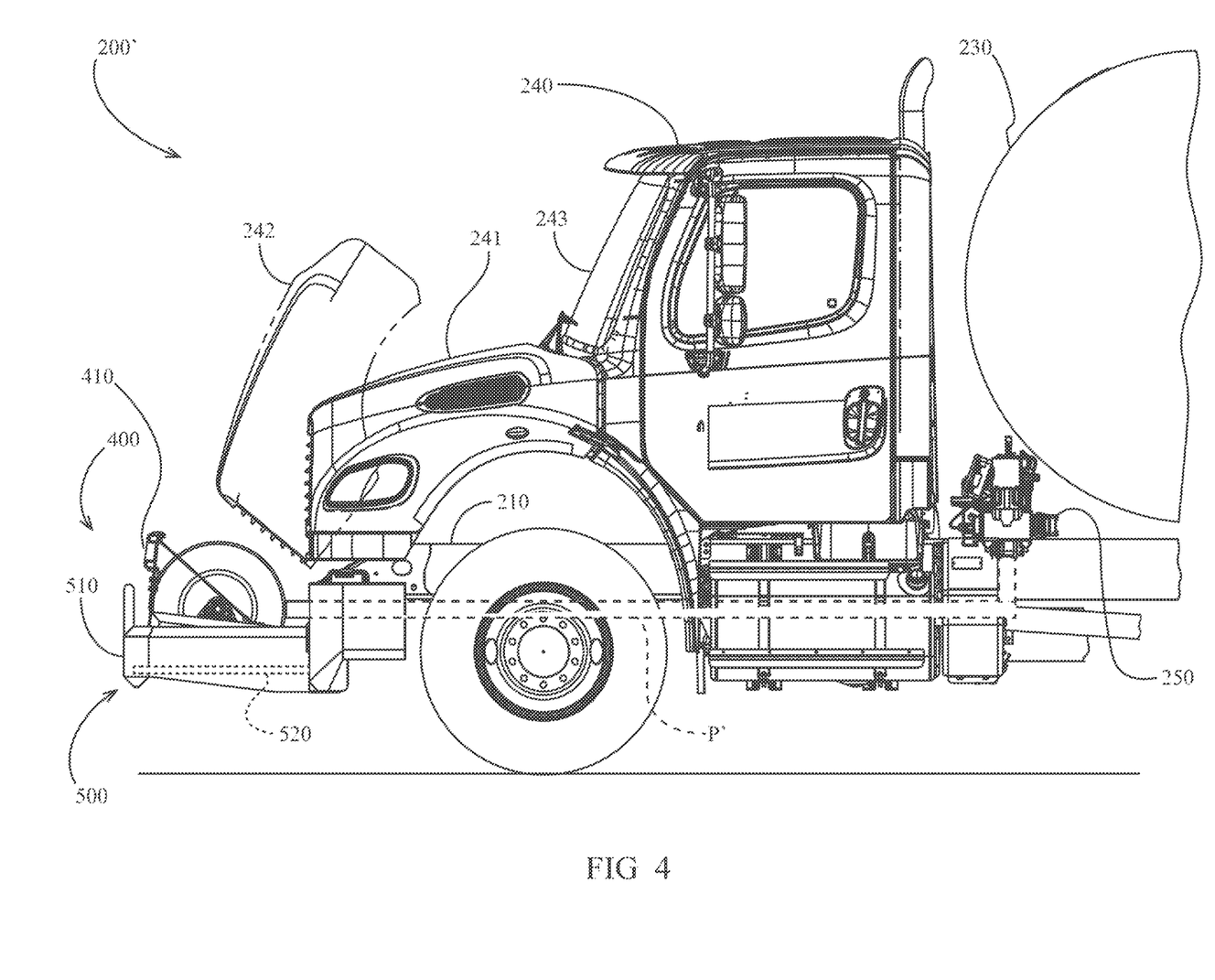
FIG. 4 is a partial side elevation view of another embodiment of a fuel delivery system.
Figure 5:
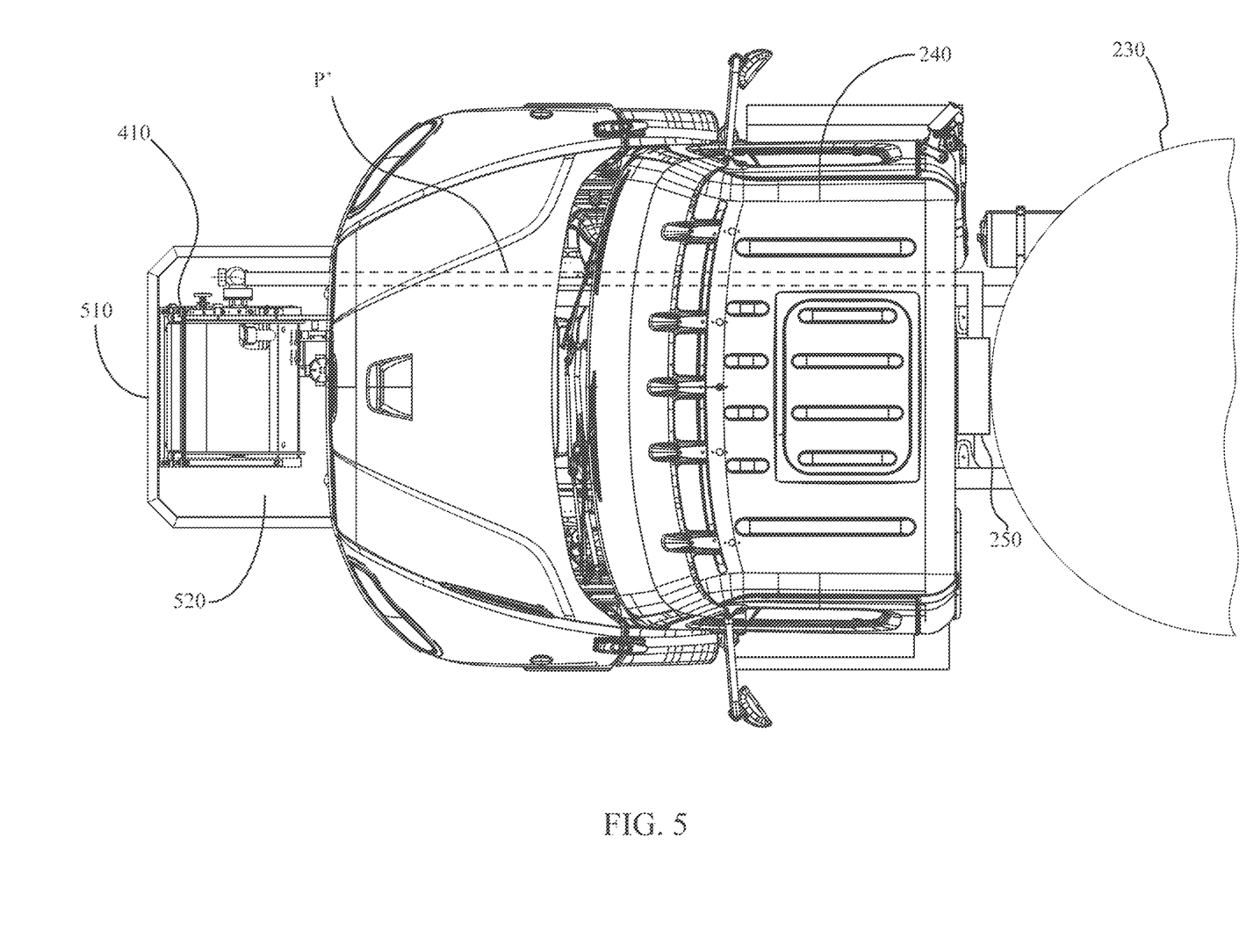
FIG. 5 is a partial top view of the fuel delivery system of FIG. 4.

Referring to FIGS. 4 and 5, an embodiment of a front reel assembly 400 including a reel 410 is supported on (e.g., mounted to) a reel support assembly 500 such as a support surface 520 thereof. The reel support assembly 500 is optionally mounted to a forward end of the frame 210. The reel 410 is optionally positioned forward of the truck 240 such that the reel does not interfere with the hood 242 (e.g., in the fully open position of hood 242). A forward portion 510 of the reel support assembly 500 optionally extends forward of the reel 410. A hose (not shown) may be supported on reel 410 and may optionally be in fluid communication with the vessel 230 and/or meter 250 via piping P' (e.g., one or more pipes or other rigid conduits). At least a portion of piping P' optionally extends beneath the operator cab 243 of truck 240. At least a portion of piping P' extends rearward of the cab of truck 240.

Figure 8:
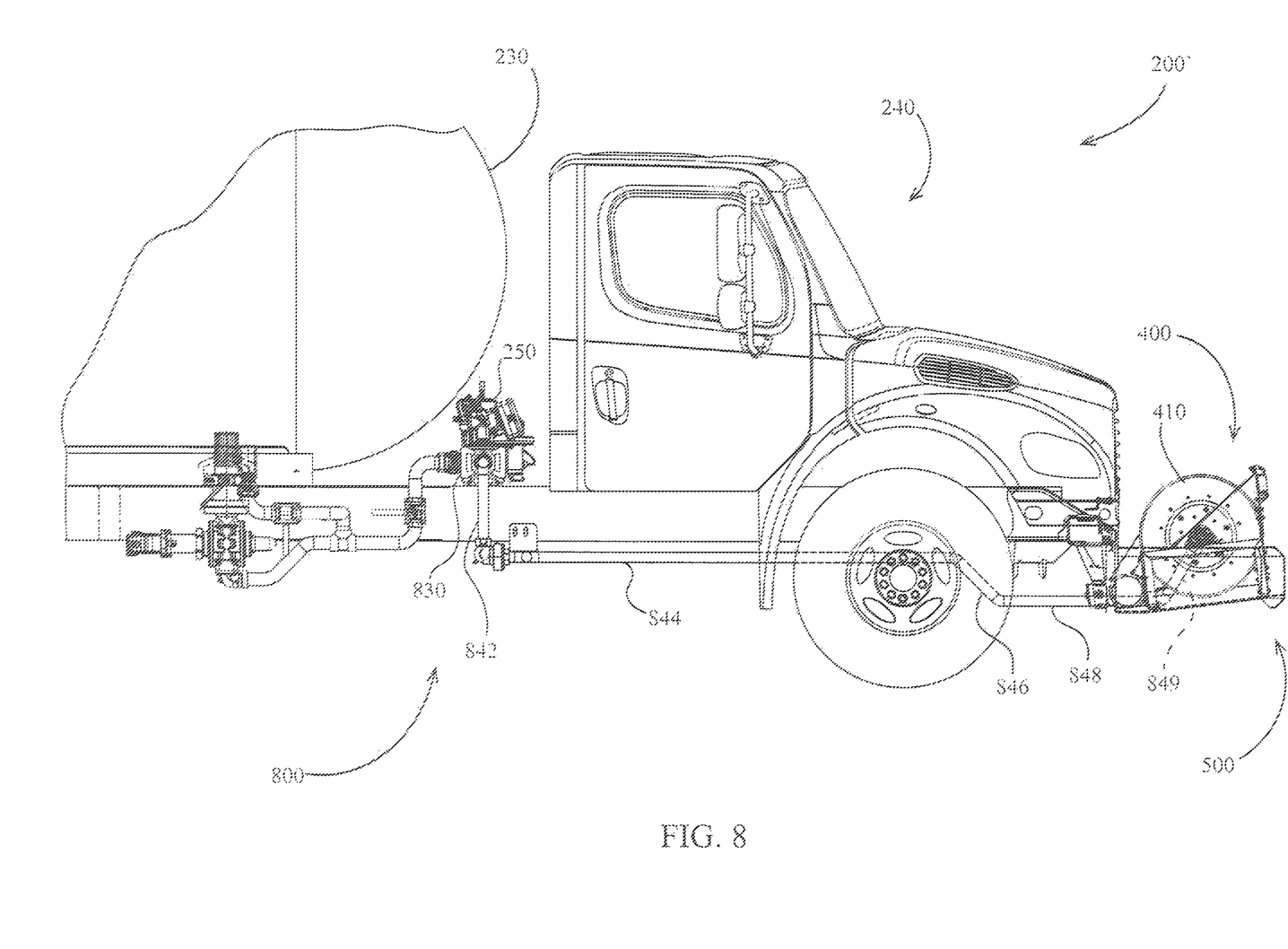
FIG. 8 is a partial side elevation view of another embodiment of a fuel delivery system.
Figure 9:
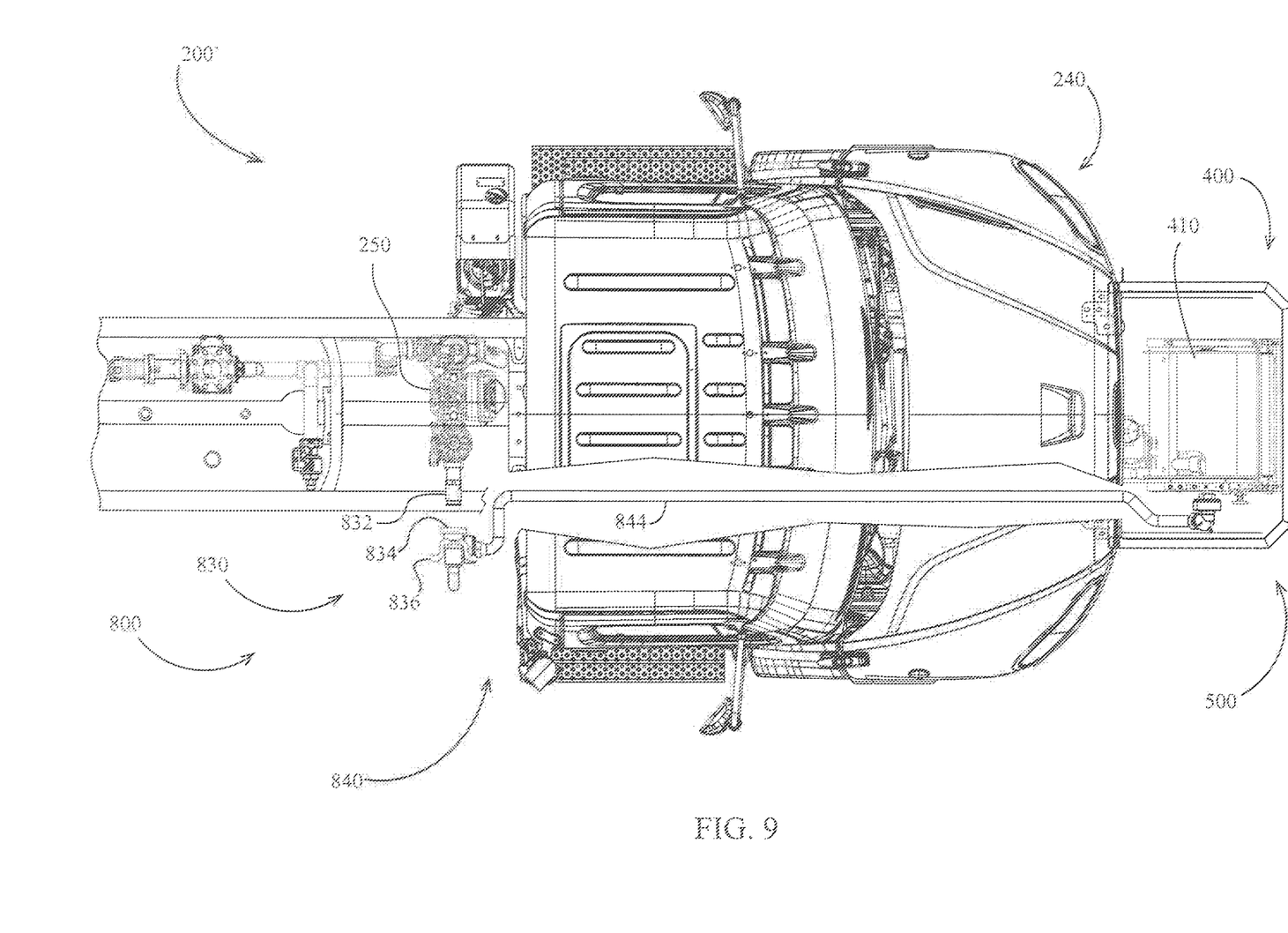
FIG. 9 is a partial top view of the fuel delivery system of FIG. 8 with a fuel vessel not shown.

Referring to FIGS. 8 and 9, another embodiment of piping assembly 800 is illustrated for fluidly coupling (e.g., selectively fluidly coupling) the vessel 230 to reel 410. The piping assembly 800 optionally includes a generally downwardly extending conduit 842 which is optionally fluidly coupled to the meter 250 and/or coupling 830, a generally longitudinally extending conduit 844 which may extend at least partially beneath the truck 240, a generally forwardly and downwardly extending conduit 846, a generally longitudinally extending conduit 848 which may extend underneath or through a front bumper of the truck 240, and a generally upwardly and forwardly extending conduit 849 which is optionally fluidly coupled to the reel 410. Some or all conduits of the piping assembly 800 are optionally rigid conduits and are optionally joined by welding or by fittings (e.g., elbow fittings, straight fittings, etc.). The piping assembly 800 optionally includes a selectively separable coupling 830 (e.g., comprising a TODO-GAS coupling such as model no. DN40-DN50 available from Gardner Denver Ltd in Margate, Kent, United Kingdom). The coupling 830 optionally includes an interface 836 (e.g., handle, etc.) for selectively coupling and/or uncoupling first and second couplers 832, 834. The coupling 830 optionally includes a valve (e.g., spring-loaded normally closed valve) which optionally prevents product flow unless the coupling 830 is secured in the coupled state.

Figure 6:
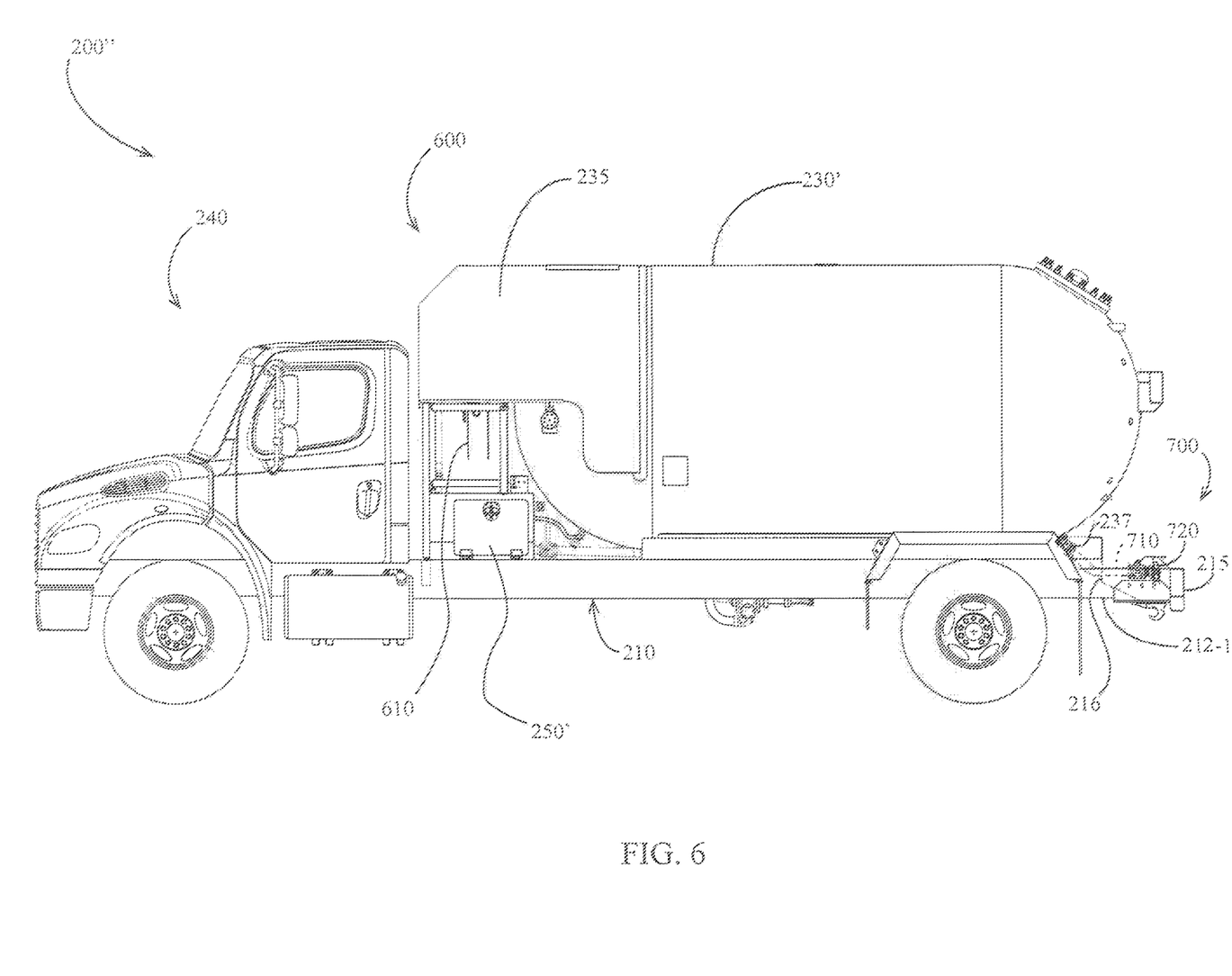
FIG. 6 is a side elevation view of another embodiment of yet another embodiment of a fuel delivery system.
Figure 7:
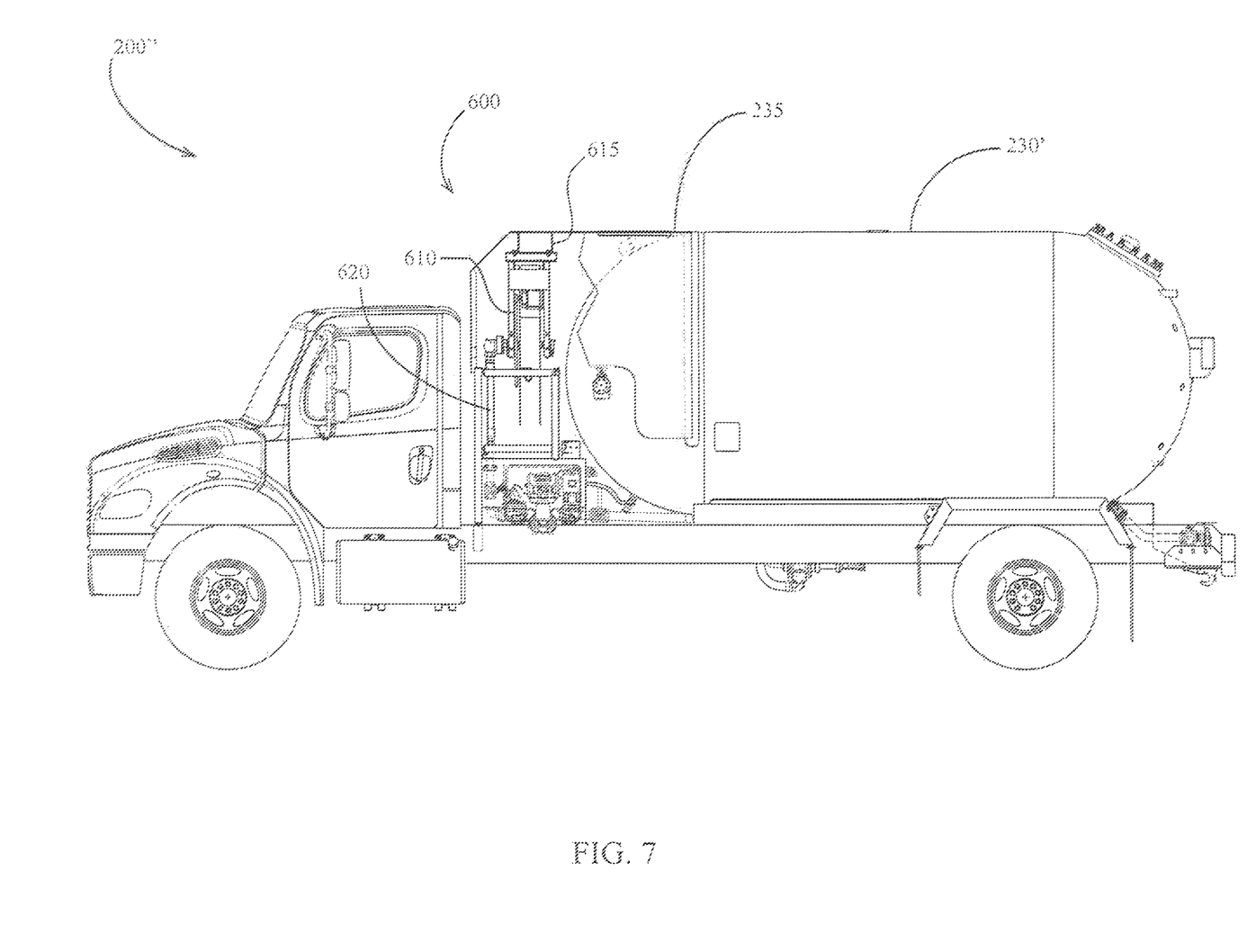
FIG. 7 is a side elevation view of the fuel delivery system of FIG. 6 with a canopy partially cut away.

Referring to FIGS. 6 and 7, another embodiment of a delivery vehicle 200" is shown wherein a reel assembly 600 is provided rearward of the truck 240. In this embodiment, the reel assembly 600 includes a reel 610 for supporting a flexible fuel transfer hose in fluid communication with a vessel 230' via piping 620. The piping 620 may be connected to a meter 250' in fluid communication with vessel 230'. In some embodiments, the reel 610 is inverted (e.g., supported from above the reel by a bracket 615 or other structure). In some embodiments, the reel 610 is supported on a canopy 235 (e.g., by bracket 615); which may be supported on (e.g., welded to) the vessel 230'. In some embodiments, at least a portion of the canopy 235 is semi-cylindrical in cross-section. In some embodiments, the vessel 230' is positioned on frame 210 at a longitudinal spacing from the truck 240 permitting the placement of the reel 610 between vessel 230' and truck 240. In some alternative embodiments, the reel 610 is supported on the truck 240 (e.g., a rear wall thereof) or on a panel, canopy or other structure supported on the truck 240.

Referring to FIG. 6, in some embodiments a loading assembly 700 is provided on the vessel 230'. The loading assembly optionally includes piping 710 (e.g., a spray fill or vapor line) fluidly coupled to an opening 237 in the vessel 230'. The piping 710 optionally extends at least partially downward to a nozzle 720. The nozzle 720 and/or piping 710 is optionally disposed between rails 212-1, 212-2 of frame 210. A bumper 215 is optionally supported on (e.g., mounted to) frame 210 at a position rearward of the nozzle 720. The piping 710 optionally extends through a wall 216 of frame 210.

Figure 10:
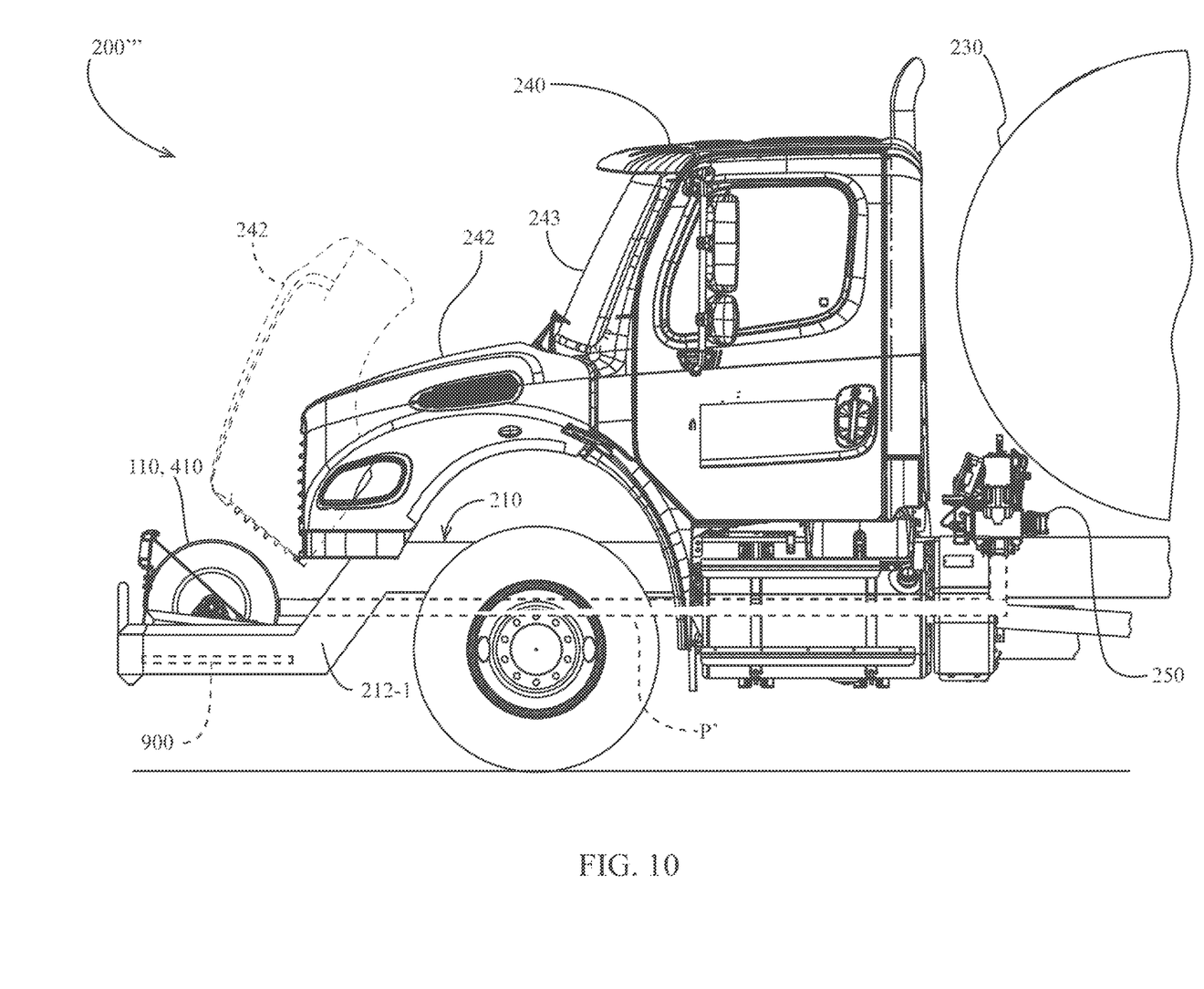
FIG. 10. is a partial side elevation view of another embodiment of a fuel delivery system.
Figure 11:
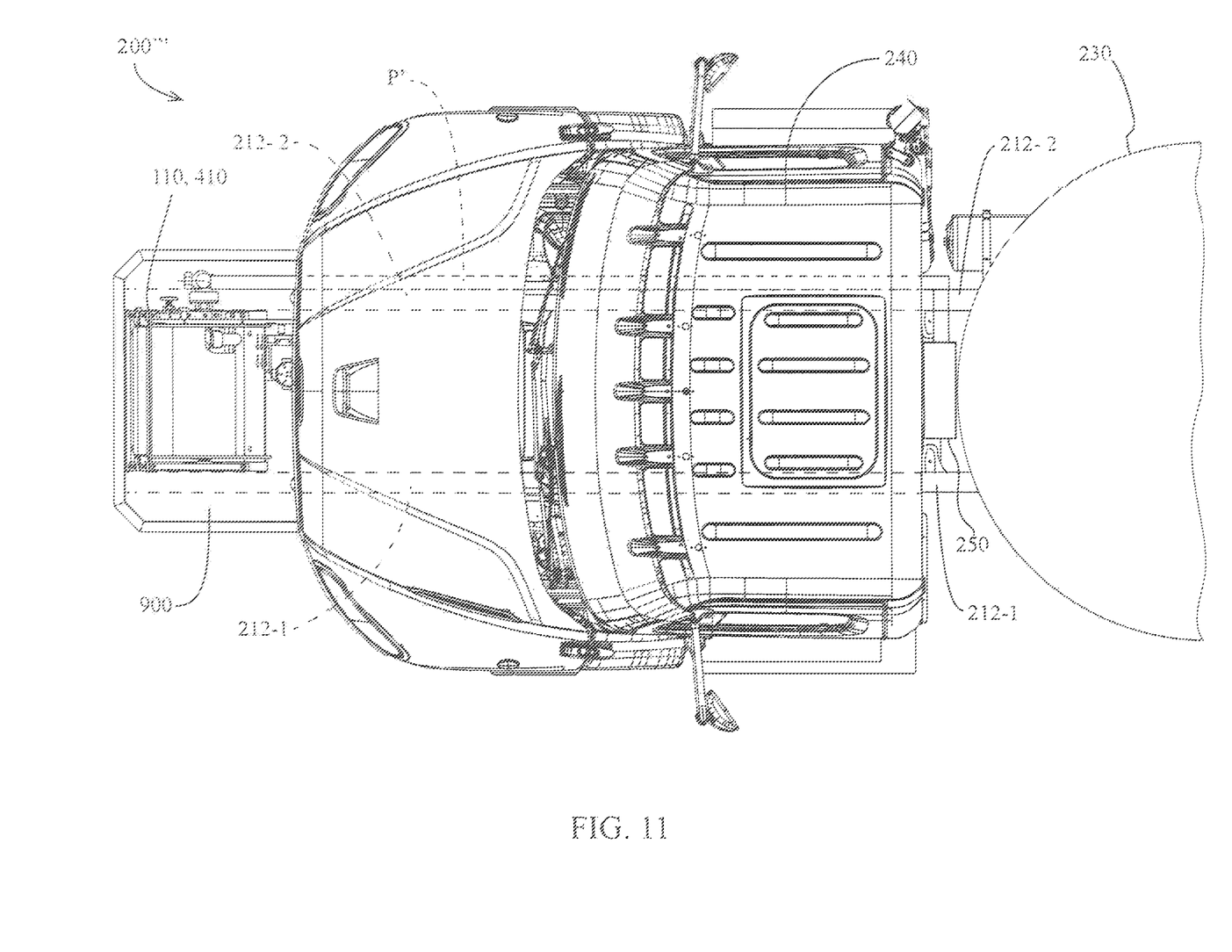
FIG. 11 is a partial top view of the fuel delivery system of FIG. 10.

FIGS. 10 and 11 illustrate an alternative embodiments of the delivery vehicle 200" which may be substantially the same as the previously described embodiments of the delivery vehicles 200, 200' having a front reel assembly 100, 400, except that in this embodiment, the rails 212-1, 212-2 of the vehicle frame 210, extend forwardly of the cab 243 and engine of the truck 240 to serve as a support for the reels 110, 410, rather than the reels being mounted on reel support assembly 100, 500 to the forward portion 211 of the frame 210. As shown in FIG. 10, the rails 212-1, 212-2 are configured to extend downwardly and forwardly of the cab 243 and engine of the truck 240 such that when the reel 110, 410 is mounted on a plate or platform 900 between the rails 212-1, 212-2, the reel 110, 410 does not interfere with the hood 242 when in the fully open position.)

In operation of the various embodiments described herein, the delivery vehicle 200, 200' may be driven forward to a position near a secondary vessel (e.g., stationary vessel, etc.) and the hose on the reel embodiments (e.g., reel 110, 410 or 610) may be extended and fluidly coupled with the secondary vessel for unloading and/or loading operations.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A fuel delivery vehicle, comprising:
a truck having a cab and an engine compartment;
a wheeled frame supporting said truck, said wheeled frame being drawn by said truck, said wheeled frame comprising a first longitudinally extending rail, said wheeled frame comprising a second longitudinally extending rail laterally offset from said first longitudinally extending rail;
a fuel storage vessel supported by said first and second longitudinally extending rails, said fuel storage vessel being disposed substantially behind said truck along a travel direction of said truck;
a metering device in fluid communication with said fuel storage vessel; and
a reel supporting a fuel delivery hose, said reel disposed at least partially forward of said engine compartment, said fuel delivery hose in fluid communication with said fuel delivery vessel and said metering device, wherein a portion of said first longitudinal rail is disposed at a first side of said reel, and wherein a portion of said second longitudinal rail is disposed at a second side of said reel opposite said first side of said reel.

2. The fuel delivery vehicle of claim 1, wherein said reel is in fluid communication with said fuel storage vessel.

3. The fuel delivery vehicle of claim 1, wherein said first rail at least partially obscures said reel when viewed from said first side.

4. The fuel delivery vehicle of claim 3, wherein said second rail at least partially obscures said reel when viewed from said second side.

5. The fuel delivery vehicle of claim 1, wherein said first rail extends from a position rearward of said cab to a position forward of said engine compartment.

6. The fuel delivery vehicle of claim 5, wherein said second rail extends from a position rearward of said cab to a position forward of said engine compartment.

7. The fuel delivery vehicle of claim 1, wherein said first rail extends at least partially forward of said reel.

8. The fuel delivery vehicle of claim 7, wherein said second rail extends at least partially forward of said reel.

9. The fuel delivery vehicle of claim 1, wherein said reel is oriented to rotate about an axis generally transverse to the travel direction of said truck.

10. The fuel delivery vehicle of claim 1, wherein said first rail at least partially supports said reel.

11. The fuel delivery vehicle of claim 10, wherein said second rail at least partially supports said reel.

12. The fuel delivery vehicle of claim 1, further comprising a platform at least partially supporting said reel, wherein said first rail at least partially supports said platform.

13. The fuel delivery vehicle of claim 12, wherein said second rail at least partially supports said platform.

14. The fuel delivery vehicle of claim 12, wherein said truck further comprises an engine compartment hood displaceable between a fully closed position and a fully open position, wherein said reel is disposed such that said engine compartment hood does not contact said reel in said fully open position.

15. The fuel delivery vehicle of claim 1, wherein said truck further comprises an engine compartment hood displaceable between a fully closed position and a fully open position, wherein said reel is disposed such that said engine compartment hood does not contact said reel in said fully open position.

16. The fuel delivery vehicle of claim 1, wherein said meter is disposed at least partially behind said cab.

17. The fuel delivery vehicle of claim 1, wherein said fuel delivery hose is in fluid communication with said fuel storage vessel via rigid piping, in which at least a portion of said rigid piping extends beneath at least one of said engine compartment and said cab.

18. The fuel delivery vehicle of claim 1, further comprising a platform supporting said reel and a bumper disposed forward of said platform.

19. The fuel delivery vehicle of claim 1, further comprising a separable coupling disposed at least partially between said fuel vessel and said engine compartment.

20. The fuel delivery vehicle of claim 1, wherein said fuel storage vessel comprises a propane storage vessel.

* * * * *